United States Patent
Sundström

(10) Patent No.: US 8,924,623 B2
(45) Date of Patent: Dec. 30, 2014

(54) METHOD FOR MANAGING MULTI-LAYERED DATA STRUCTURES IN A PIPELINED MEMORY ARCHITECTURE

(75) Inventor: Mikael Sundström, Luleå (SE)

(73) Assignee: Oricane AB, Lulea (SE)

( * ) Notice: Subject to any disclaimer, the term of this patent is extended or adjusted under 35 U.S.C. 154(b) by 372 days.

(21) Appl. No.: 13/387,374

(22) PCT Filed: Jul. 28, 2010

(86) PCT No.: PCT/SE2010/050871
§ 371 (c)(1),
(2), (4) Date: Apr. 13, 2012

(87) PCT Pub. No.: WO2011/014118
PCT Pub. Date: Feb. 3, 2011

(65) Prior Publication Data
US 2012/0191919 A1    Jul. 26, 2012

(30) Foreign Application Priority Data
Jul. 28, 2009   (SE) ...................................... 0950567

(51) Int. Cl.
*G06F 12/02*    (2006.01)
*G06F 12/06*    (2006.01)

(52) U.S. Cl.
CPC ............ *G06F 12/0223* (2013.01); *G06F 12/06* (2013.01)
USPC .......... 711/5; 711/140; 711/122; 711/E12.024

(58) Field of Classification Search
CPC .............................. G06F 12/06; G06F 12/0223
USPC .......................... 711/140, 122, 5, 6, E12.024
IPC ................................ G06F 12/08,12/06, 12/0223
See application file for complete search history.

(56) References Cited

U.S. PATENT DOCUMENTS

| | | | |
|---|---|---|---|
| 5,555,405 A | 9/1996 | Griesmer et al. | |
| 7,321,926 B1 * | 1/2008 | Zhang et al. | 709/220 |
| 7,802,180 B2 * | 9/2010 | Warner et al. | 715/234 |
| 2002/0091856 A1 | 7/2002 | Brown | |
| 2004/0205304 A1 * | 10/2004 | McKenney et al. | 711/148 |
| 2012/0198463 A1 * | 8/2012 | Cheng | 718/103 |
| 2012/0284646 A1 * | 11/2012 | Sitrick et al. | 715/753 |

FOREIGN PATENT DOCUMENTS

WO    2008/048185 A1    4/2008

OTHER PUBLICATIONS

International Search Report for corresponding patent application No. PCT/SE2010/050871 dated Nov. 16, 2010.
Timothy Sherwood, "A Pipelined Memory Architecture for High Throughput Network Processors", The 30th International Symposium on Computer Architecture (ISCA), Jun. 2003, pp. 1-12.

(Continued)

*Primary Examiner* — Pierre-Michel Bataille
(74) *Attorney, Agent, or Firm* — Renner, Otto, Boisselle & Sklar, LLP

(57) ABSTRACT

A method for managing multi-layered data structures in a pipelined memory architecture, comprising the steps of: —providing a multi-level data structure where each level corresponds to a memory access; —storing each level in a separate memory block with respect to the other levels. In this way, a more efficient usage of memory is achieved.

2 Claims, 1 Drawing Sheet

(56) References Cited

OTHER PUBLICATIONS

Extended European Search Report for corresponding patent application No. EP 10804795 dated Sep. 17, 2014.

Sundstrom et al.; "High-performance longest prefix matching supporting high-speed incremental updates and guaranteed compression", INFOCOM2005. $24^{th}$ Annual Joint Conference of the IEEE Computer and Communications Societies. Proceedings IEEE Miami, FL, Mar. 13-17, 2005, vol. 3, pp. 1641-1652.

* cited by examiner

METHOD FOR MANAGING MULTI-LAYERED DATA STRUCTURES IN A PIPELINED MEMORY ARCHITECTURE

This application is a national phase of International Application No. PCT/SE2010/050871 filed Jul. 28, 2010 and published in the English language.

TECHNICAL FIELD

The present invention relates to a method for managing multi-layered data structures in pipelined memory architecture.

BACKGROUND

To achieve a more efficient usage of memory, it is desirable that all different kinds of data structures require the same amount of memory from each level (layer). While this is not possible, the second best approach would be to ensure that a group of (say t instances) from a certain type of data structure uses a fixed amount of memory from each level. In fact, it would be even better if each group from each kind of structure occupies exactly the same amount of memory in each memory bank.

Thus, there is a demand to solve the problem with usage of memory of a multi-layered data structure.

SUMMARY OF THE INVENTION

An object of the present invention is to solve the problem(s) stated above.

To achieve this, we let t instances from each type of data structure will constitute a group of said type. Each instance within the group is referred to by a number between 0 and t−1, called the instance number and the group as a whole is referred to by a group pointer. The group pointer refers to the first memory block within each memory bank that contains data from one instance within the group. Preferably, the memory and groups are organized such that the first memory block of each group, in the different banks, begins at the same offset. Therefore, the group pointer is merely an offset from the beginning of the memory.

Further objects and advantages with the present invention will be described as follows in relations to embodiments of the present invention being described as follows.

BRIEF DESCRIPTION OF DRAWING FIGURES

The present invention will now be described in more detail referring accompanying drawing figures of which:

DESCRIPTION OF THE INVENTION

The purpose of the following invention is to manage layouts of multi-level data structures where each level corresponds to a memory access and is stored in a separate memory bank with respect to the other levels. Furthermore, the size (measured in some appropriate memory size unit such as bytes, memory blocks, cache lines etc.) of the memory of each level from each type or kind of data structure is completely determined by the order in which the levels are accessed.

Let $S[0], S[1], \ldots, S[t-1]$ be the size of level $0, 1, \ldots, t-1$ of a certain type of data structure. When lookup is performed in the data structure, level 0 is accessed in the first memory access, level 1 in the second memory access, and so forth until level t−1 is accessed in memory access t, which completes the lookup.

Now suppose that we store n instances of such data structures in a memory structure consisting of t memory banks $0, 1, \ldots, t-1$ of sizes $M[0], M[1], \ldots, M[t-1]$, respectively.

A straight forward approach is to organize this such that memory bank 0 contains level 0 from all instances, bank 1 contains level 1 from all instances, and so on until bank t−1 which contains level t−1 from instances.

In many cases, the sizes of the different levels in of one type of data structure are extremely different, in fact, it is not uncommon that the size is a function which is exponential in the level. That is, $S[i]=B^i$ for some non-negative integer B. If only one type of data structure is used, this is not necessarily a problem (even though a hardware engineer would most likely argue that the size of each level should be the same.). However, if several different kinds of data structures needs to be stored, the sizes of each memory bank must be configured either to accommodate for one of the kind or for the other kind.

Figure 1:
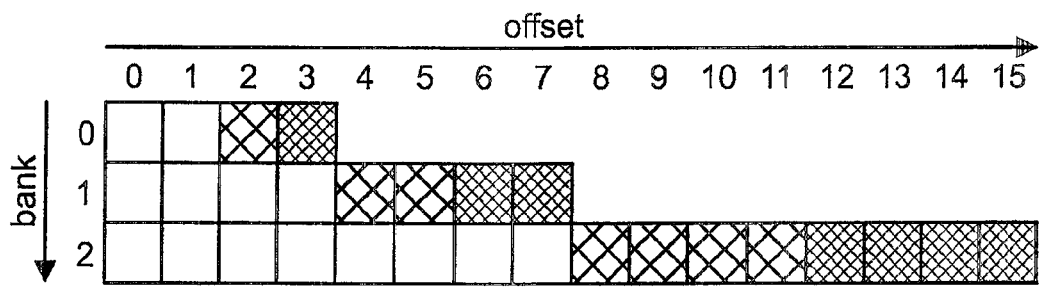
FIG. 1 illustrates three memory banks configured to store four instances of 2-structures.
Figure 2:
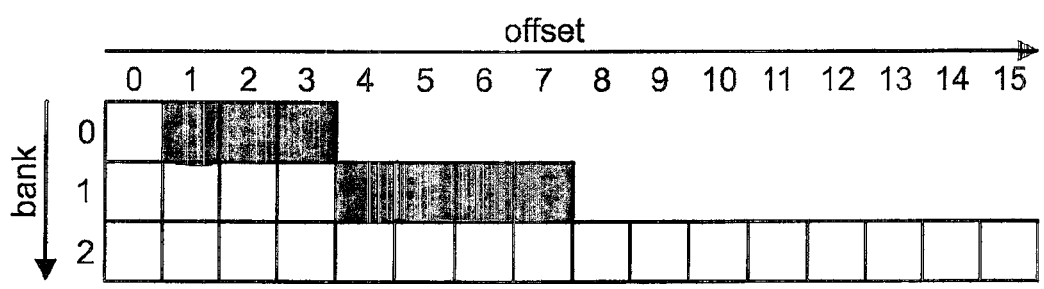
FIG. 2 illustrates one instance of a 4-structure in the memory banks configured for 2-structures, wherein the 7 unused memory blocks are shown as crossed black squares.
Figure 3:
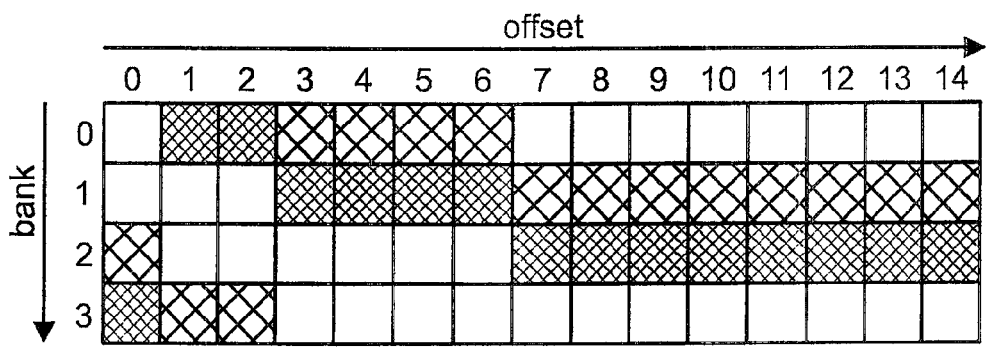
FIG. 3 illustrates group consisting of four instances of four level 2-structures stored according to an embodiment of the present invention.

Now is referred to the drawing FIGS. 1-3.

In either case, there is a risk that a large part, or all, of the provided memory will store data structures of the other kind, rendering a large part of the memory unused.

To further illustrate this problem, consider two types data structures with B=2 and B=4. Let us refer to these as 2-structures and 4-structures, respectively. Furthermore, assume that both of these types each consists of three levels.

If the memory is configured for 2-structures we have that $M[2]=2\times M[1]=4\times M[0]$ (see Drawing 1). Now, if we store a 4-structures instead of 2-structures, level 2 of a single 4-structure will occupy the entire bank 2 which means that we can only store one 4-structure. As a result, there will be unused memory in bank 0 and 1 (see Drawing 2).

From this organization, it follows that the memory occupied by each group in each memory bank is the exactly the same amount as required to store all levels from one instance of the type of data structure. That is each group will use $S[0]+S[1]+\ldots+S[t-1]$ blocks of memory from each memory bank.

Instances are stored in the memory banks with level 0 from each instance stored at the beginning of the group memory (i.e. the memory location at offset group pointer from the beginning of the memory bank). Level 0 from instance number i is stored in memory bank i. This is followed by level 1 which is stored directly after level 0 in each bank such that level 1 from instance i is stored in bank (i+1) MOD t. This is continued until level t−1 from each instance is stored at the end of the group memory in the respective memory bank.

Drawing 3 shows an example of a group of four 2-structures, each of four levels, organized this way. Each instance is shown in a separate shade of gray.

The present invention is by no means limited to the particular embodiment described and illustrated in relation to FIG. 3.

As already disclosed above, it would be a great advantage if each group from each kind of structure occupies exactly the same amount of memory in each memory bank. This is accomplished by means of the present invention.

The invention claimed is:

1. A method for managing multi-layered data structures in a pipelined memory architecture, comprising the steps of:
   providing a multi-level data structure where each level corresponds to a memory access;
   storing each level in a separate memory bank with respect to the other levels;
   providing a plurality of types of data structures;
   providing t instances from each type of data structure to constitute a group of said type, wherein each instance within the group is referred to by a number between 0 and t−1, called the instance number and the group as a whole is referred to by a group pointer; and
   providing the group pointer to refer to a first memory block within each memory bank that contains data from one instance within the group.

2. The method according to claim 1, comprising the step of:
   organizing the memory banks and groups such that the first memory block of each group, in the different banks, begins at the same offset.

* * * * *